(12) United States Patent
Tashiro et al.

(10) Patent No.: US 6,926,608 B2
(45) Date of Patent: Aug. 9, 2005

(54) RECORDING MEDIUM STORING THREE-DIMENSIONAL IMAGE PROCESSING PROGRAM, THREE-DIMENSIONAL IMAGE PROCESSING PROGRAM, METHOD AND DEVICE

(75) Inventors: Manabu Tashiro, Kobe (JP); Tatsuya Shinkai, Suita (JP)

(73) Assignees: Konami Corporation, Tokyo (JP); Konami Computer Entertainment Osaka, Inc., Osaka (JP)

( * ) Notice: Subject to any disclaimer, the term of this patent is extended or adjusted under 35 U.S.C. 154(b) by 87 days.

(21) Appl. No.: 10/191,143

(22) Filed: Jul. 9, 2002

(65) Prior Publication Data

US 2003/0013523 A1 Jan. 16, 2003

(30) Foreign Application Priority Data

Jul. 12, 2001 (JP) ........................................ 2001-212703

(51) Int. Cl.[7] .............................................. A63F 13/00
(52) U.S. Cl. ........................................... 463/31; 463/32
(58) Field of Search ...................................... 463/30–33

(56) References Cited

U.S. PATENT DOCUMENTS 6,226,008 B1 * 5/2001 Watanabe et al. ............ 345/427
6,394,897 B1    5/2002 Togami
6,491,585 B1 * 12/2002 Miyamoto et al. ............ 463/33
6,603,479 B1 * 8/2003 Mifune et al. ............... 345/474

FOREIGN PATENT DOCUMENTS

| EP | 0 844 587 | 5/1998 | |
| EP | 0 933 105 | 8/1999 | |
| JP | 8-069274 | 3/1996 | |
| JP | 10305173 | 11/1998 | |
| JP | 11-137842 | 5/1999 | |
| JP | 2000-322591 A | * 11/2000 | ........... G06T/15/00 |
| JP | 2001-070632 | 3/2001 | |

* cited by examiner

Primary Examiner—Julie Brocketti
(74) Attorney, Agent, or Firm—Jordan and Hamburg LLP (57) ABSTRACT

To display an image seen from a suitable camera viewpoint, the present invention comprises a viewpoint determination section 301 that finds a position of the camera viewpoint appropriate to a control operation of determining an action of the main character (main object), which control operation is assumed to be performed by the game player; a viewpoint movement section 302 that moves the camera viewpoint from its current position to the position found by the viewpoint determination section 301; and an image display section 303 that displays an image of the main character seen from the camera viewpoint.

15 Claims, 8 Drawing Sheets

RECORDING MEDIUM STORING THREE-DIMENSIONAL IMAGE PROCESSING PROGRAM, THREE-DIMENSIONAL IMAGE PROCESSING PROGRAM, METHOD AND DEVICE

BACKGROUND OF THE INVENTION

1. Field of the Invention

The present invention relates to technology for moving within virtual three-dimensional space in which there are arranged objects of a plurality of types and for displaying an image of the main object, being the object that plays the central role in progress of a game, seen from a virtual camera viewpoint.

2. Description of the Related Art

In recent years, various types of game device have become common in which objects such as characters are displayed in virtual three-dimensional space created on a monitor screen. Such game devices are known which simulate skiing, surfing, motor boating, snowboarding, skateboarding and car racing etc. In such a game device, an image of the main character (main object), which is the character that plays the central role in progress of the game, viewed from a virtual camera viewpoint, is displayed on a monitor screen with which the game device is provided, and the game player proceeds with the game by manual control of the main character etc, whilst referring to this image.

With such a game device, the game becomes more exciting and the interest of the game is increased as the speed with which the main character moves through virtual three-dimensional space is increased. Also, as the speed with which the main character moves through virtual three-dimensional space increases, quicker reactions on the part of the game player in controlling the main character are demanded, making it necessary for the game player to concentrate on controlling the main character. Conventionally, as the method of moving the position of the camera viewpoint, for example the method was employed of moving this so as to track the movement locus of the main character.

With this method, when for example the direction of movement of the main character changes, the position of the camera viewpoint may be inappropriate, making it necessary to perform a manual control operation to alter this to a suitable position. Such a manual operation to alter the position of the camera viewpoint imposes a burden on the game player and constituted a factor impeding concentration on operation of the main character.

SUMMARY OF THE INVENTION

In view of the foregoing, an object of the present invention is to provide a recording medium which stores a three-dimensional image processing program, three-dimensional image processing method and device whereby an image seen from a suitable camera viewpoint is displayed.

In order to achieve the above object, one aspect of the present invention relates to a recording medium which stores a three-dimensional image processing program that displays an image of a main object which is an object that plays a central role in the progress of a game and that moves through virtual three-dimensional space in which objects of a plurality of types are arranged, seen from a virtual camera viewpoint. Said program is configured to make a game device function as: viewpoint determination means that finds a position of said camera viewpoint appropriate to a control operation of determining an action of the main object, which control operation is assumed to be performed by the game player; viewpoint movement means that moves said camera viewpoint from its current position to the position found by said viewpoint determination means; and image display means that displays an image of the main object seen from said camera viewpoint.

With the aforementioned invention, the three-dimensional image processing program makes the game device function as viewpoint determination means that finds a position of said camera viewpoint appropriate to a control operation of determining an action of the main object, which control operation is assumed to be performed by the game player; viewpoint movement means that moves said camera viewpoint from its current position to the position found by said viewpoint determination means; and image display means that displays an image of the main object seen from said camera viewpoint.

Specifically, the viewpoint determination means finds a camera viewpoint position appropriate to the control operation of determining the action of the main object, which is assumed to be performed by the game player; the viewpoint movement means moves the camera viewpoint from its current position to the position found by the viewpoint determination means; and the image display means displays an image of the main object seen from the camera viewpoint.

In this way, since an image of the main object seen from a camera viewpoint appropriate to the control operation assumed to be performed by the game player is displayed, the game player can concentrate on the operation of determining the action of the main object without needing to perform operation to move the camera viewpoint to a desired position. As a result, the speed of movement of the main object through virtual three-dimensional space can be increased, resulting in an exciting game and increasing the interest of the game.

Also, since the camera viewpoint is automatically moved to a position where an image appropriate to the control operation of the game player can be displayed, an image that is well adapted to control operations by the game player can be displayed in a natural and smooth fashion without the game player being conscious of movement of the camera viewpoint.

These and other objects, features and advantageous of the present invention will become more apparent upon reading the following detailed description along with the accompanied drawings.

DESCRIPTION OF THE PREFERRED EMBODIMENTS

Figure 1:
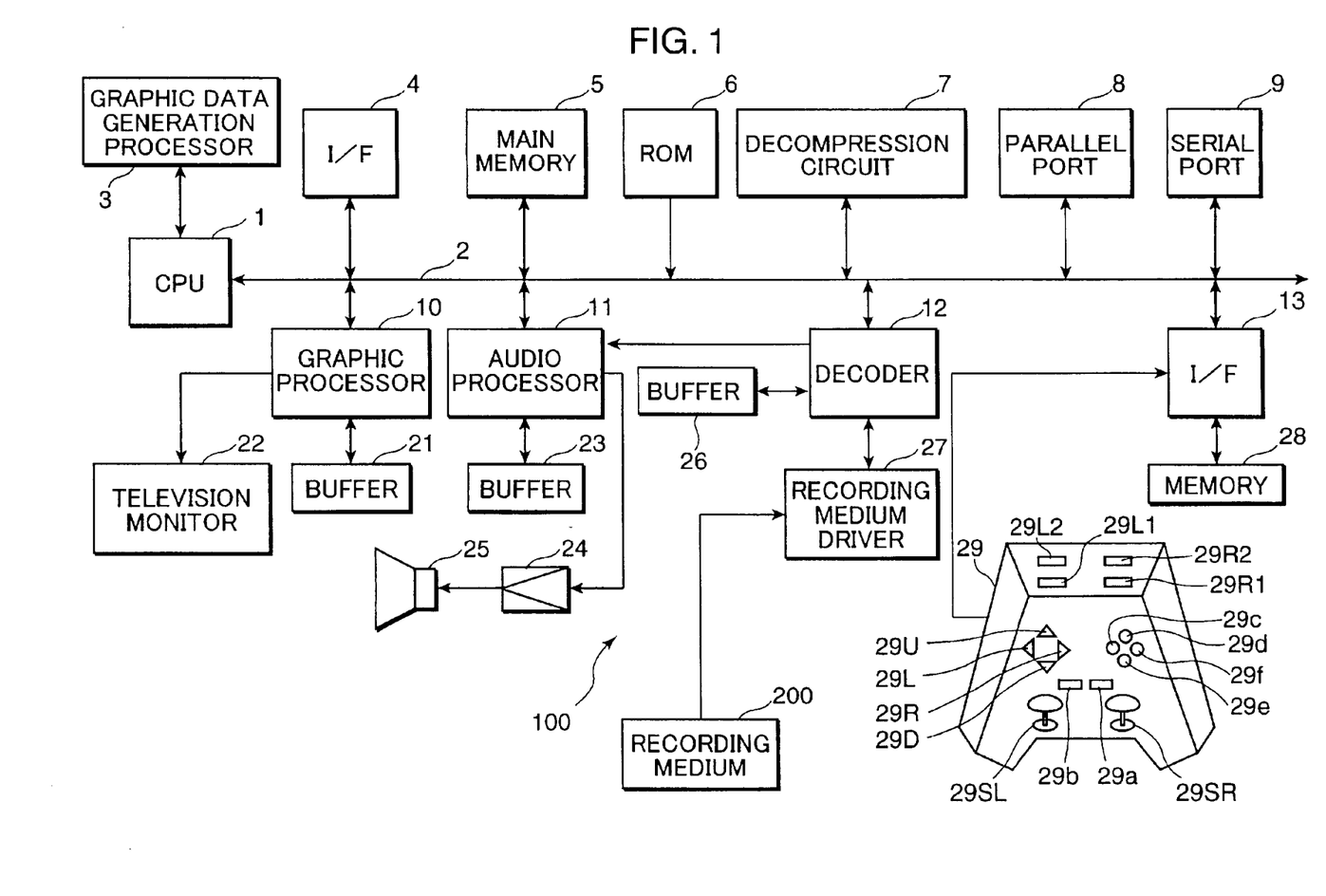
FIG. 1 is a block layout diagram illustrating an embodiment of a video-game device to which the present three-dimensional image processing device is applied.

FIG. 1 is a block layout diagram illustrating an embodiment of a video-game device to which the present three-dimensional image processing device is applied. This video-game device comprises a game machine main unit 100 and a recording medium 200 on which program data is recorded. Game machine main unit 100 comprises a CPU (central processing unit) 1, a bus line 2 comprising an address bus, data bus and control bus connected with CPU 1, and a graphic data generation processor 3.

To bus line 2 there are connected an interface circuit 4, main memory 5 comprising RAM (random access memory) etc, ROM (read-only memory) 6, decompression circuit 7, parallel port 8, serial port 9, graphic processor 10, audio processor 11, decoder 12 and interface circuit 13. A buffer 21 is connected to graphic processor 10 and a television monitor (hereinbelow called "monitor") 22 is connected thereto; a buffer 23 is connected to audio processor 11 and speakers 25 are connected thereto through an amplifier circuit 24. Also, a buffer 26 is connected to decoder 12 and a recording medium driver 27 is connected thereto; memory 28 is connected to interface circuit 13 and controller 29 is connected thereto.

Such a video-game device may have different configurations depending on the application. For example, if this video-game device is constituted for domestic use, monitor 22 and speakers 25 are separate from game machine main unit 100. Or if it is constituted as a video-game device for commercial use, all of the structural elements illustrated in FIG. 1 are accommodated in a single casing. On the other hand, if this video-game device is constituted using a personal computer or workstation as its nucleus, monitor 22 corresponds to the computer display and graphic processor 10, audio processor 11 and decompression circuit 7 respectively correspond to part of the program data recorded on recording medium 200 or hardware on an expansion board mounted in an expansion slot of the computer, while interface circuit 4, parallel port 8, serial port 9 and interface circuit 13 correspond to hardware on an expansion board mounted in an expansion slot of the computer. Also, buffers 21, 23 and 26 respectively correspond to areas of main memory 5 or expanded memory (not shown). In this embodiment, the case where this video-game device is constituted for domestic use will be described by way of example.

Next, the structural elements shown in FIG. 1 will be described. Graphic data generation processor 3 performs the role of a so-called co-processor of CPU 1. That is, this graphic data generation processor 3 performs co-ordinate transformation and/or light source calculation, for example calculation of matrices of fixed decimal point form and/or vector processing, by parallel processing. The chief processing that is performed by this graphic data generation processor 3 is processing to find the address on the display area of the image that is the subject of processing, by using the co-ordinate data of the vertices in two-dimensional or three-dimensional space of the image data supplied from CPU 1, data of the amount of movement and data of the amount of rotation, and to again return this address data to CPU 1; and/or processing to calculate the brightness of the image in accordance with distance from a virtually set up light source etc.

Interface circuit 4 serves to provide interfacing of peripheral devices such as for example pointing devices such as a mouse or trackball. ROM 6 stores the program data constituting the operating system of the video-game device. In the case of a personal computer, this corresponds to the BIOS (Basic Input Output System).

Decompression circuit 7 performs decompression processing on compressed images compressed by intracoding in accordance with the MPEG (Moving Picture Engineering Group) standard for video and/or the JPEG (Joint Picture Engineering Group) standard in respect of stationary images. Decompression processing comprises decoding processing (decoding of data encoded using VLC (Variable Length Code)), inverse quantization processing, IDCT (inverse discreet cosine transform) processing, and recovery processing of an intra image etc. Graphic processor 10 performs display processing on buffer 21 in accordance with display instructions provided by CPU 1 at intervals of a prescribed time T (one frame, for example T=1/60 sec).

Buffer 21 consists for example of RAM and comprises a display area (frame buffer) and non-display area. The display area is an area for the expansion of data to be displayed on the display screen of monitor 22. In this embodiment, the non-display area is a storage area for data defining skeletons, model data defining polygons, animation data for effecting movement of the model and pattern data for indicating the details of each animation and, in addition, texture data and/or color palette data etc.

The texture data is two-dimensional image data. The color palette data is data for designating the color of the texture data etc. These data may be recorded in the non-display area of buffer 21 beforehand by CPU 1 from recording medium 200 all at once or on a plurality of occasions, matching the state of progress of the game. The display instructions comprise display instructions for displaying a three-dimensional image using polygons and display instructions for displaying an ordinary two-dimensional image. The polygons are two-dimensional virtual figures of polygonal shape; in this embodiment, triangles are employed. The display instructions for displaying three-dimensional images using polygons are performed respectively in regard to the polygon vertex address data on the display area of buffer 21, the texture address data indicating the position of storage on buffer 21 of the texture data and affixed to the polygons, color palette address data indicating the position of storage on buffer 21 of color palette data indicating the color of the texture data and brightness data indicating the brightness of the textures.

Of these data, the polygon vertex address data on the display area are substituted by graphic data generation processor 3 for the polygon vertex co-ordinate data in two dimensions by co-ordinate conversion of the polygon vertex co-ordinate data in three-dimensional space from CPU 1 in accordance with data of the amount of movement and data of the amount of rotation of the screen itself. Also, the brightness data are determined by graphic data generation processor 3 in accordance with the distance from the virtually arranged light source of the position indicated by the polygon vertex co-ordinate data after the aforesaid co-ordinate conversion from CPU 1. The polygon vertex address data indicate addresses on the display area of buffer 21; graphic processor 10 performs processing for writing texture data corresponding to the range of the display area of buffer 21 indicated by these three items of polygon vertex address data.

An object such as a character in virtual game space is constituted by a large number of polygons. CPU 1 stores the co-ordinate data of each polygon in three-dimensional space in buffer 21 in association with the vector data of the corresponding skeleton. Then, when the character is made to move on the display screen by manual control operation of controller 29, to be described, in other words, when either movement of the character itself is represented or the position of the viewpoint from which the character is viewed is changed, processing is performed as follows.

That is, CPU 1 supplies graphic data generation processor 3 with three-dimensional co-ordinate data of the co-ordinates of the polygons held in the non-display area of buffer 21 and with data of the amount of movement and data of the amount of rotation of each polygon found from data of the co-ordinates and amount of rotation of the skeleton. Graphic data generation processor 3 successively finds the three-dimensional co-ordinate data after movement and after rotation of each polygon, using the three-dimensional co-ordinate data of the vertices of each polygon and the amount of movement data and amount of rotation data of each polygon. Of the three-dimensional co-ordinate data of each polygon which are thus found, the horizontal and vertical direction co-ordinate data are supplied to graphic processor 10 as address data on the display area of buffer 21 i.e. as the polygon vertex address data. Graphic processor 10 writes texture data indicated by the pre-allocated texture address data to the triangular display area of buffer 21 indicated by the three items of polygon vertex address data. In this way, an object wherein texture data is affixed to a large number of polygons is displayed on the display screen of monitor 22.

The display instructions for displaying an ordinary two-dimensional image are performed respectively in regard to the vertex address data, texture address data, color palette address data indicating the position of storage in buffer 21 of the color palette data indicating the color of the texture data and brightness data indicating the brightness of the texture. Of these data, the vertex address data are co-ordinate data obtained by graphic data generation processor 3 by co-ordinate conversion of the vertex co-ordinate data on the two-dimensional plane from CPU 1, using the amount of movement data and amount of rotation data from CPU 1.

The audio processor 11 stores ADPCM (Adaptive Differential Pulse Code Modulation) data read from recording medium 200 in buffer 23 and uses these ADPCM data stored in buffer 23 as a sound source. Audio processor 11 then reads the ADPCM data under the control of a clock signal of frequency of for example 44.1 kHz. Audio processor 11 then performs processing such as pitch conversion, noise addition, envelope setting, level setting and addition of reverberation on the ADPCM data read from buffer 23.

When the audio data read from a recording medium 200 is PCM data such as CD-DA (Compact Disk Digital Audio), this is converted by audio processor 11 into ADPCM data. Also, processing of the PCM data using program data is directly carried out in main memory 5. PCM data that has been processed in main memory 5 is supplied to audio processor 11, where it is converted to ADPCM data and then subjected to various processing as described above before being output from speakers 25 as audio.

Recording medium driver 27 may be for example a CD-ROM drive, hard disk drive, optical disc drive, flexible disc drive, silicon disc drive, or cassette media reader. Recording medium 200 may be for example a CD-ROM, hard disk, optical disc, flexible disk, or semiconductor memory. Recording medium driver 27 reads images, audio, or program data from recording medium 200 and supplies the data that has been read to decoder 12. Decoder 12 performs error correction processing using ECC (Error Correction Code) on the reproduced data from recording medium driver 27 and supplies this data that has been subjected to error correction processing to main memory 5 or audio processor 11. Memory 28 comprises a memory of for example the holder and card type. A card type memory serves to hold various game parameters at the time point of interruption so as to for example hold the condition at the time-point of interruption in the event that the game is interrupted whilst being played.

Controller 29 is a manual control means capable of being manually controlled from outside; it comprises a first left button 29L1, second left button 29L2, first right button 29R1, second right button 29R2, up key 29U, down key 29D, left key 29L, right key 29R, start button 29a, select button 29b, first button 29c, second button 29d, third button 29e, fourth button 29f, left stick 29SL and right stick 29SR; a manual control signal corresponding to the manual operation performed by the game player is sent to CPU 1. Up key 29U, down key 29D, left key 29L and right key 29R enable a game player to issue commands to CPU 1 for example to move a character or the cursor vertically or horizontally on the screen of monitor 22. The start button 29a enables the game player to indicate to CPU 1 the commencement of game program data loaded from recording medium 200. Select button 29b enables the game player to indicate to CPU 1 various types of selection relating to game program data loaded into main memory 5 from recording medium 200.

In controller 29, all of the buttons and keys, with the exception of left stick 29SL and right stick 29SR, are on/off switches that are turned on when depressed from the neutral position by pressure from outside and are turned off by returning to this neutral position when the pressure is removed. Left stick 29SL and right stick 29SR are constituted by a stick type controller of practically the same construction as a so-called joystick. Specifically, its construction comprises an upright stick, this stick being capable of being tilted through 360°, including forwards/backwards and left/right, about a prescribed position as fulcrum. The arrangement is such that the values of the x co-ordinate in the left/right direction and the y co-ordinate in the forwards/backwards direction, taking the upright position as the origin, in accordance with the direction of tilting of the stick and the angle of tilt of the stick are sent to CPU 1 as manual control signals through interface circuit 13. The functions of the first left button 29L1, second left button 29L2, first right button 29R1 and second right button 29R2 are different depending on the game program data loaded from recording medium 200.

An outline of the operation of this video-game device will now be given. When the power switch (not shown) is turned on, power is supplied to the video-game device. If a recording medium 200 is then inserted into recording medium driver 27, CPU 1, in accordance with the operating system stored in ROM 6, gives instructions for reading of the program data from recording medium 200 to recording medium driver 27. In response to this, recording medium driver 27 reads images, audio and program data from recording medium 200. The images, audio and program data that are thus read are supplied to decoder 12, where error correction processing is performed.

The image data that has been subjected to error correction processing in decoder 12 is supplied to decompression circuit 7 through bus line 2 where decompression processing as described above is performed; it is then supplied to graphic processor 10 and is written to the non-display area of buffer 21 by this graphic processor 10. Also, audio data that has been subjected to error correction processing in decoder 12 is written to main memory 5 or is supplied to audio processor 11, whence it is written to buffer 23. Also, program data that has been subjected to error correction processing in decoder 12 is written to main memory 5. Thereafter, CPU 1 proceeds with the game in accordance with the game program stored in main memory 5 and instructions supplied by the game player using controller 29. That is, in accordance with instructions received from the game player through controller 29, CPU 1 performs control of image processing, control of audio processing and control of internal processing in an appropriate manner.

As control of image processing, in this embodiment, for example calculation of the co-ordinates of skeletons and calculation of vertex co-ordinate data of polygons from pattern data corresponding to the animation designated for the character, supply of the three-dimensional co-ordinate data which has been obtained and/or viewpoint position data to graphic data generation processor 3, and issuance of display instructions including address data on the display area of buffer 21 requested by graphic data generation processor 3 and/or brightness data are performed. As control of audio processing, for example audio output commands are issued in respect of audio processor 11 and instructions are given regarding level and reverberation etc. As control of internal processing, for example calculations in response to the manual control operation of controller 29 are performed.

In this embodiment, the case where the game that is run on game device 1 is a snowboarding game will be described. This snowboarding game is a game in which a snowboarder, who is the main character (main object), advances sliding along a ski-slope in three-dimensional space in which are arranged a plurality of types of objects (such as for example rails and kickers) under manual control by a game player using controller 29. For example, to make the direction of advance of the main character change to the right, right key 29R is pressed, while to make the direction of advance of the character change to the left, left key 29L is pressed. When the speed of movement of the main character is to be increased, up key 29U is pressed; when the speed of movement is to be decreased, down key 29D is pressed. When, with various objectives, the main character is to be made to jump from the ski slope, third button 29e is pressed.

The essentials of the rules of the game regarding movement of the main character on rails or kickers, which are objects arranged on the ski-slope, and control operation performed by the game player in respect of the main character will now be described. The game player earns points in the game by making the main character jump up onto and slide along a narrow strip-shaped rail, from the approach to the rail. In order to cause the main character to mount the rail, positional alignment of the main character and the rail is necessary, so the game player frequently carries out control operation (depression of down key 29D) to decrease the speed of movement of the main character beforehand. Also, the game player causes the main character to jump from the ramp-shaped kicker when the main character is in the approach to the kicker and acquires more points in the game, the longer the distance jumped. In order to increase the distance jumped by the main character, the game player may frequently perform operation to increase the speed of movement of the main character beforehand (pressing up key 29U). Also, in the area where the rails and kickers are provided, the game player frequently continues to perform the jump operation (pressing of third button 29e) in order to estimate the timing for making the main character jump.

Figure 2:
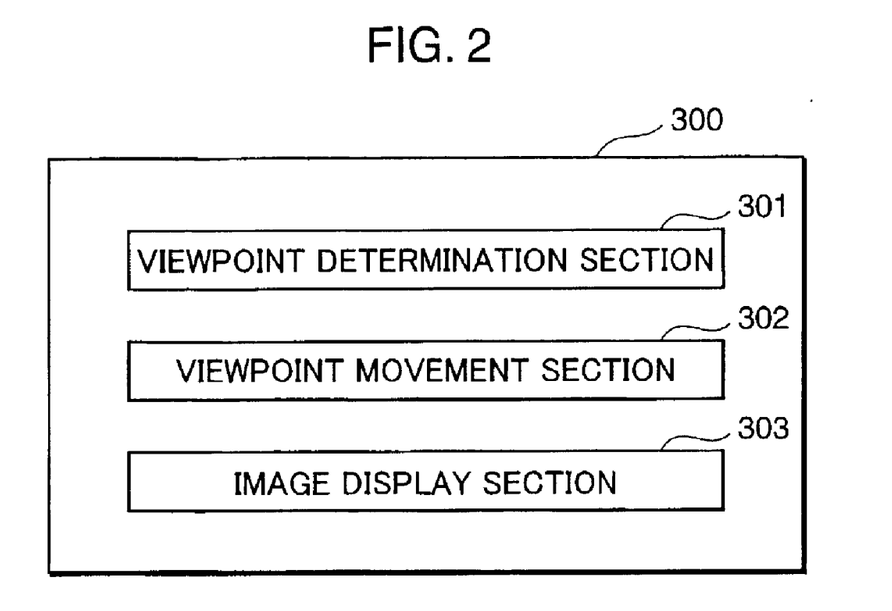
FIG. 2 is a functional block diagram of a three-dimensional image processing device according to the present invention.

FIG. 2 is a functional block diagram of a three-dimensional image processing device according to the present invention. The three-dimensional image processing program of the present invention is recorded on recording medium 200 shown in FIG. 1 in the same way as the game program mentioned above and is loaded into main memory 5; thus a three-dimensional image processing device is implemented by CPU 1 sequentially running the three-dimensional image processing program in main memory 5 whilst accepting control operations performed by the game player using controller 29.

Three-dimensional image processing device 300 comprises a viewpoint determining section 301 (viewpoint determination means) that finds a camera viewpoint position appropriate to the control operation, assumed to be performed by the game player, that determines the action of the main character (main object), a viewpoint movement section 302 (viewpoint movement means) that moves the camera viewpoint towards the position found by the viewpoint determination section 301 from its current position and an image display section 303 (image display means) that displays an image viewing the main character from the camera viewpoint.

Viewpoint determination section 301 finds the position of the camera viewpoint using the history of the control operations performed by the game player in respect of the main character and the type of objects (rails and kickers etc) that are in a prescribed range of the main character. A specific description will now be given of an example of a method whereby the position of the camera viewpoint is found. In order for the game player to estimate the timing with which the main character is to be made to jump, the objects that are closest to the main character when the jump control operation (depression of the third button 29e) is continued for a prescribed time (for example 20 frames, where one frame= 1/60 sec) or more are retrieved. If the closest object is a rail, the position of the camera viewpoint appropriate to the control operation (control operation of positional alignment of the main character and the rail) to make the main character mount the rail is taken as the position of the camera viewpoint to be found. If the closest object is a kicker, the position of the camera viewpoint appropriate to the control operation (operation of determining the point of commencement of the jump) of causing the main character to jump from the kicker is taken as the position of the camera viewpoint to be found. If the closest object is an object other than a rail or kicker, the position of the camera viewpoint is not changed.

Viewpoint movement section 302 is a portion that moves the camera viewpoint with a speed found by finding the speed with which the camera viewpoint is to be moved from the speed with which the main character is moving in virtual three-dimensional space and the type of object which is in a prescribed range of the main character. A specific example of a method of finding the speed with which the camera viewpoint is to be removed will now be described. In the case where the closest object to the main character is a rail, let us assume that the speed VC with which the camera viewpoint moves is for example 0.1 times the speed VM with which the main character moves. In the case where the closest object to the main character is a kicker, let us assume that the speed VC with which the camera viewpoint moves is for example 0.2 times the speed VM with which the main character moves.

The reason why the speed VC with which the camera viewpoint moves is made larger in the case where the closest object to the main character is a kicker than in the case where it is a rail is that, in the case of a kicker, as described above, it is necessary to move rapidly to a camera viewpoint position appropriate to the manual control operation, since the game player increases the speed of movement of the main character in order to make the distance jumped larger. Also, in both cases, since the camera viewpoint moves with a speed proportional to the speed VM with which the main character moves, operability is improved and natural movement of the camera viewpoint is achieved.

Image display section 303 is a portion that displays on monitor 22 an image of the main character seen from the camera viewpoint, whose position is determined by viewpoint movement section 302 at prescribed time intervals (for example every frame). The game player performs control operation of the main character using controller 29, using this image for guidance.

Figure 3:
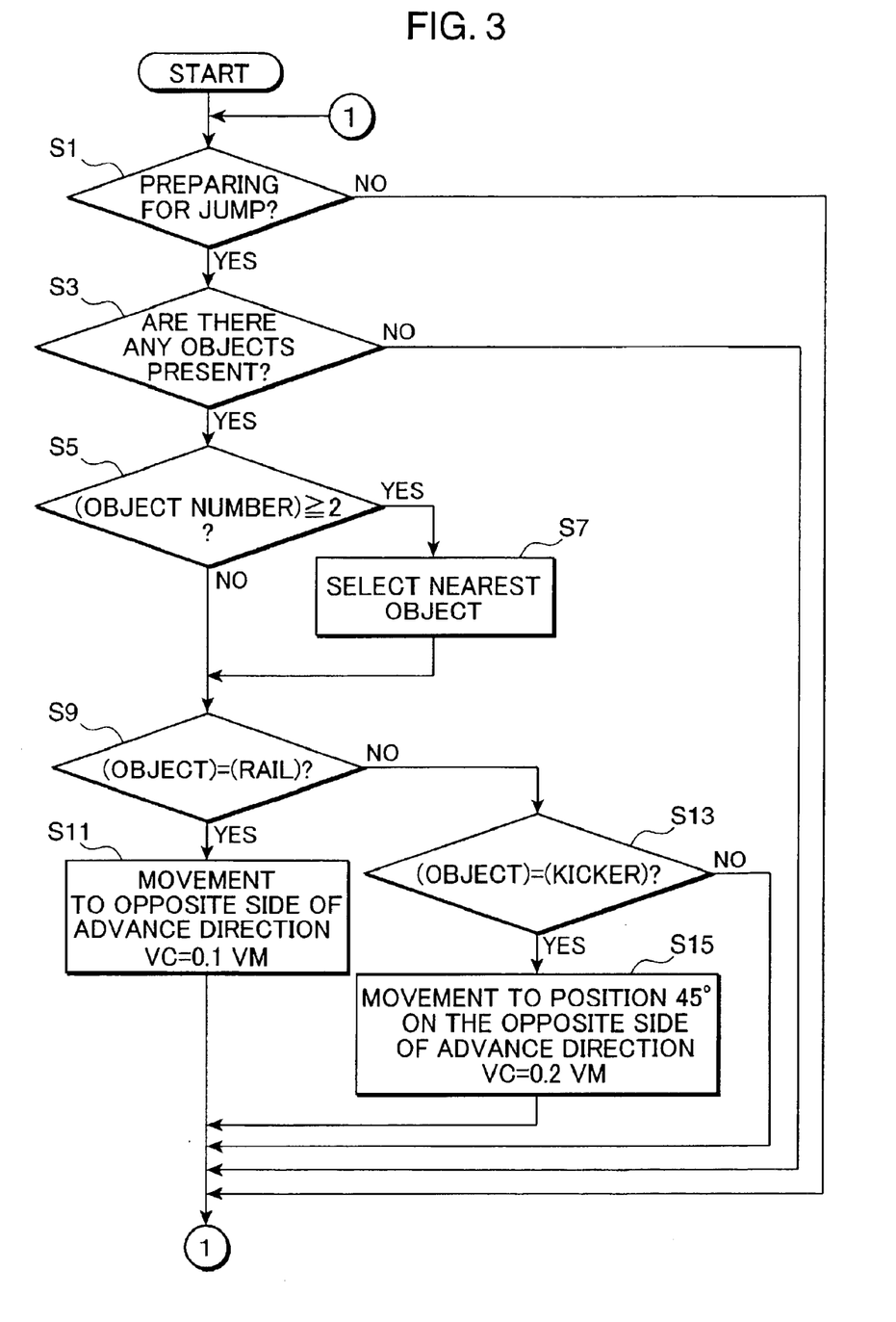
FIG. 3 is an example of a flow chart illustrating the action of a three-dimensional image processing device according to the present invention.

FIG. 3 is an example of a flow chart illustrating the action of a three-dimensional image processing device according to the present invention. First of all, viewpoint determination section 301 determines (step S1) whether or not the game player is making preparations (estimating the timing) to make the main character perform a jump. Specifically, this determination is made in accordance with whether or not the jump control operation (depression of third button 29e) has continued for at least a prescribed time (for example 20 frames, one frame=1/60 sec). If this determination yields a negative result, the determination processing is repeated until it yields a positive result. On the other hand, if the result of this determination is positive, viewpoint determination section 301 determines (step S3) whether or not an object is present within a prescribed region taking the position of the main character in virtual three-dimensional space as reference (for example, the region within a distance of 20 m from the main character in virtual three-dimensional space). If the result of this determination is negative, processing returns to step S1.

On the other hand, if the result of this determination is positive, viewpoint determination section 301 determines (step S5) whether or not the number of objects within this prescribed region is two or more. If the result of this determination is negative (if the number of objects within this prescribed region is 1), this object is selected as the object to be referred to for determining the distance of the camera viewpoint (this will herein be called the "reference object") and processing advances to step S9. On the other hand, if the result of this determination is positive, viewpoint determination section 301 selects the object whose distance from the main character is least as the object to be referred to for determining the position of the camera viewpoint (this will herein the called the "reference object") (step S7).

Next, viewpoint determination section 301 determines whether or not the reference object is a rail (step S9). If the result of this determination is negative, processing advances to step S13. On the other hand, if the result of this determination is positive (i.e. if the reference object is a rail), viewpoint determination section 301 determines the position of the camera viewpoint as a position on the opposite side to the direction of advance of the main character and viewpoint movement section 302 moves the position of the camera viewpoint to a position on the opposite side of the direction of advance of the main character (step S11); processing then returns to step S1. Since the reference object is a rail, the speed VC of movement of the camera viewpoint is then made 0.1 times the speed VM with which the main character is moving (VC=0.1×VM).

Figure 4:
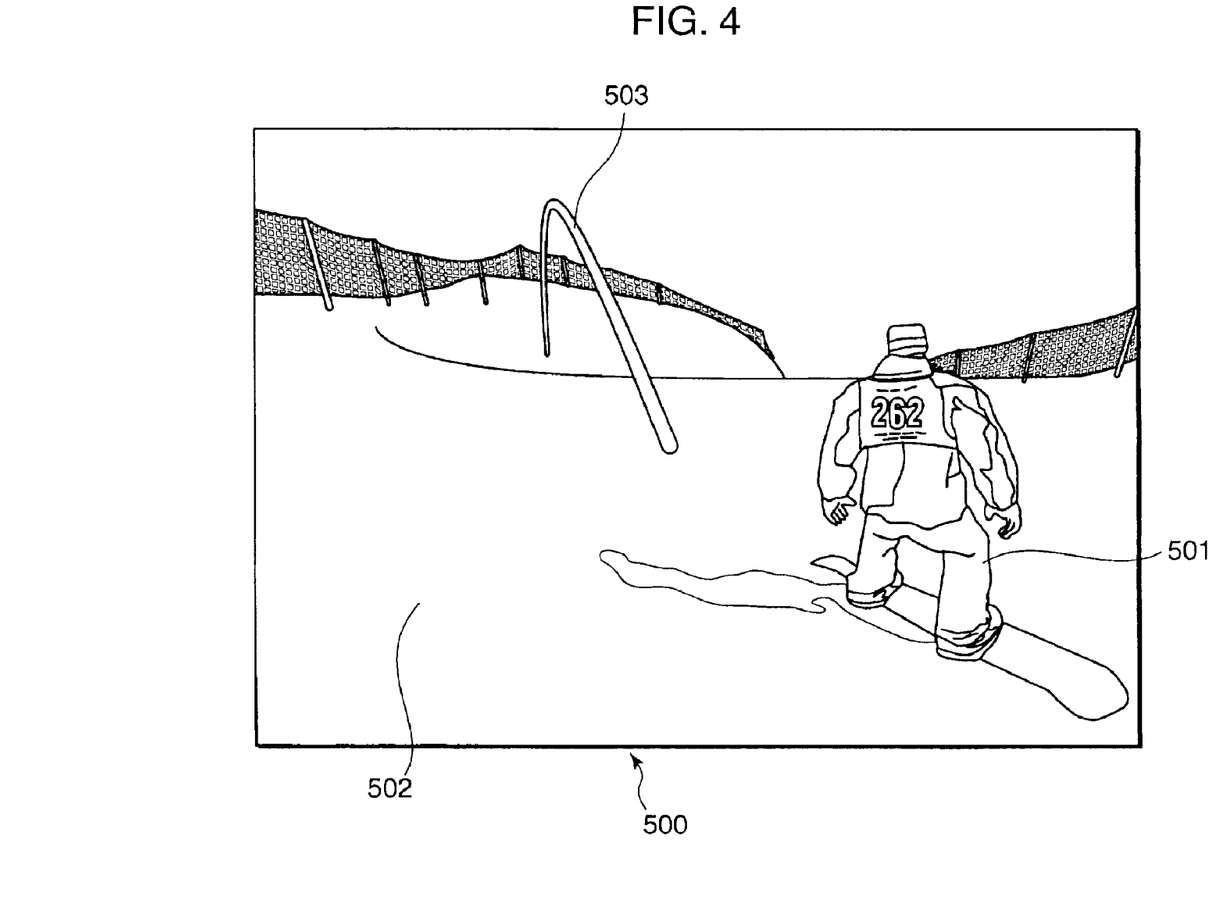
FIG. 4 is a screen view prior to movement of the camera viewpoint when the main character is approaching a rail.

FIG. 4 is a screen view prior to movement of the camera viewpoint when the main character has approached the rail. On screen 500, ski-slope 502 is displayed in roughly the lower half of the screen; a snowboarder 501 who is the main character is displayed on the right-hand side sliding in the leftwards and upwards direction of the screen along ski-slope 502; and a rail 503 is displayed roughly in the middle of the upper part of the screen in the direction of advance of snowboarder 501. With the objective of obtaining points, the game player performs positional alignment of snowboarder 501 and rail 503 and performs manual control operation of snowboarder 501 using controller 29 so as to make snowboarder 501 slide along rail 503, by making snowboarder 501 jump.

However, since, as shown in FIG. 4, rail 503 is narrow, the above positional alignment operation is difficult. Also, in this case, the camera viewpoint is in a position about 45° from the opposite side of the direction of advance of snowboarder 501 so snowboarder 501 is displayed on screen 500 in such a way as to be moving diagonally upwards in the screen; thus, the aforesaid positional alignment operation is made even more difficult.

Figure 5:
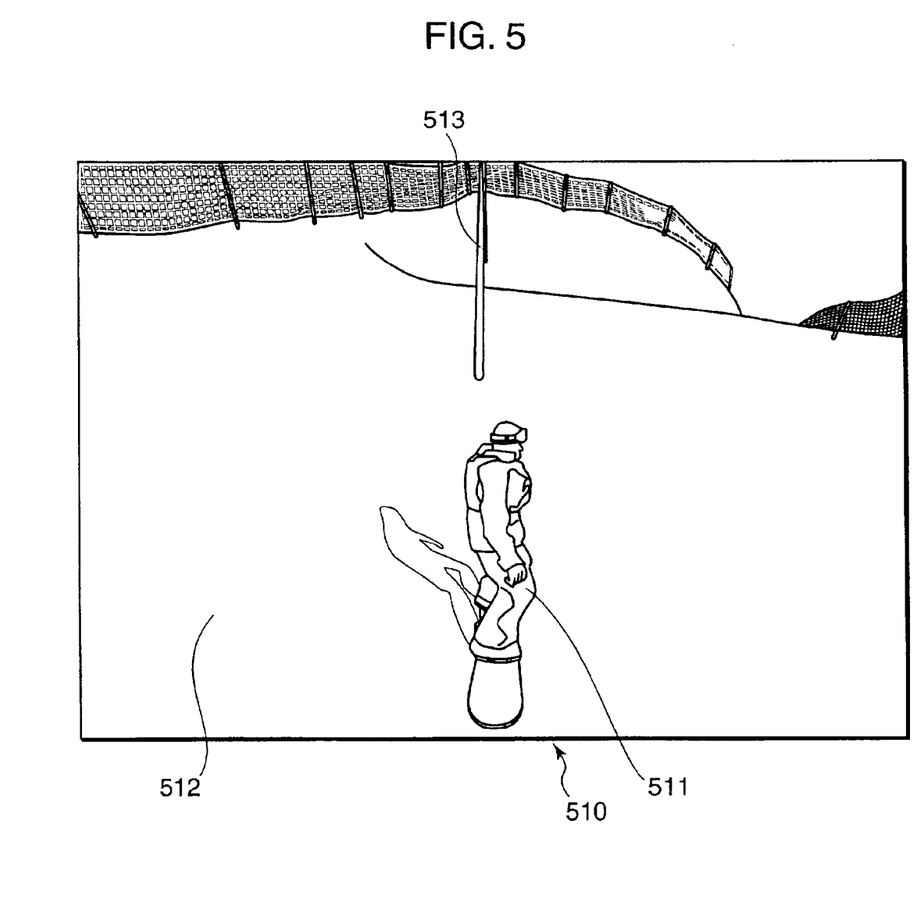
FIG. 5 is a screen view after movement of the camera viewpoint when the main character is approaching the rail.

FIG. 5 is a screen view when the main character has approached the rail, after movement of the camera viewpoint. In screen 510, ski-slope 512 is displayed in approximately the lower three-quarters of the screen; the snowboarder 511 who is the main character and who is sliding in the upwards direction of the screen over ski-slope 512 is displayed on the right hand side; and rail 513 is displayed in approximately the middle on the upper side of the screen in the direction of advance of the snowboarder 511. The game player performs operation of snowboarder 501 using controller 29 so that snowboarder 501 slides along rail 503 in the same way as in the case of FIG. 4.

In this case, since the camera viewpoint is positioned on the opposite side to the direction of advance of snowboarder 511, snowboarder 511 is displayed on screen 510 so as to move upwards across the screen, so the operation of positional alignment as described above becomes easier than in the case of FIG. 4.

If in step S9 the result of the determination is negative, a determination is made (step S13) as to whether or not the reference object is a kicker. If the result of this determination is negative, processing returns to step S1. On the other hand, if the result of this determination is positive (the reference object is a kicker), viewpoint determination section 301 determines the camera viewpoint position as a position 45° from the opposite side of the direction of advance of the main character and viewpoint movement section 302 moves the position of the camera viewpoint to a position 45° from the opposite side of the direction of advance of the main character (step S15) and then returns to step S1. The speed of movement VC of the camera viewpoint is then set to 0.2 times the speed VM of movement of the main character (VC=0.2×VM), since the reference object is a kicker.

Figure 6:
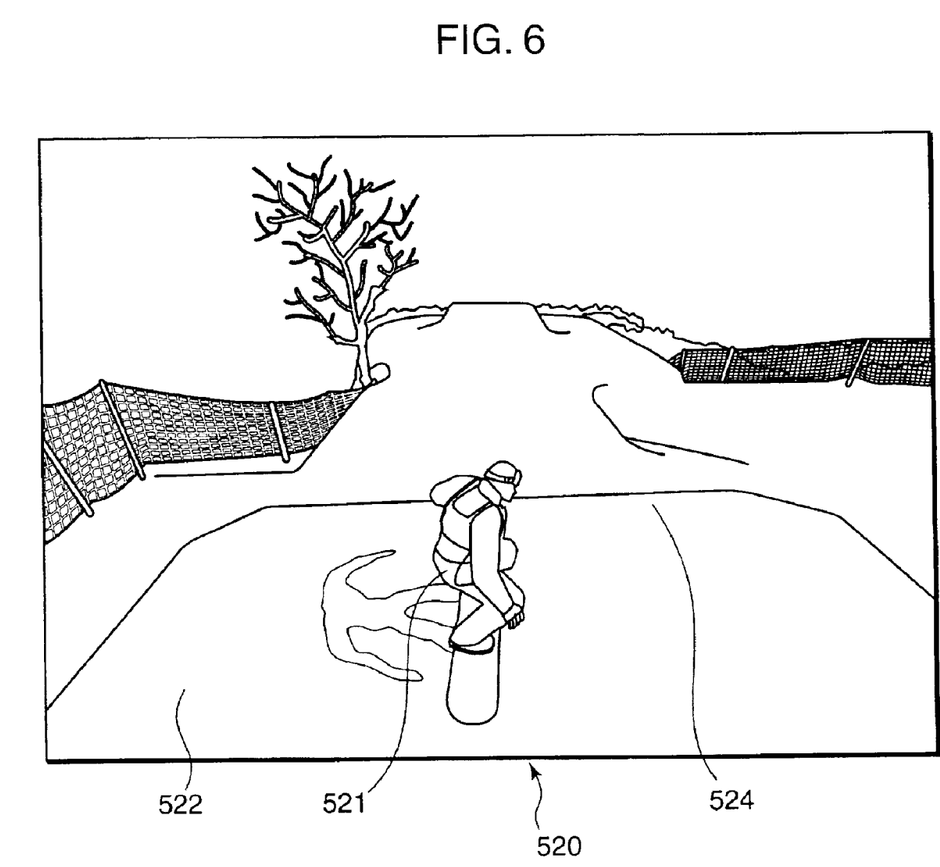
FIG. 6 is a screen view prior to movement of the camera viewpoint when the main character is approaching a kicker.

FIG. 6 is a screen view prior to movement of the camera viewpoint when the main character has approached the kicker. On screen 520, ski-slope 522 is displayed in roughly the lower half of the screen; a snowboarder 521 who is the main character is displayed roughly in the middle of the lower part of the screen sliding in the upwards direction of the screen along ski-slope 522; and a kicker 524 is displayed roughly in the middle of the screen in the direction of advance of snowboarder 521. With the objective of obtaining points, the game player performs manual control operation of snowboarder 521 using controller 29 so as to make snowboarder 521 jump from an appropriate jump starting position of kicker 524, thereby increasing the distance jumped by snowboarder 521.

Since, as shown in FIG. 6, kicker 524 is shaped as a jumping ramp, if the timing of the start of the jump is too late, the snowboarder 521 will already have passed kicker 524; contrariwise, if the timing of the start of the jump is too early, the distance jumped by snowboarder 521 will be short. Furthermore, in order to make the distance jumped long, game players will often increase the speed of sliding of snowboarder 521. The operation of determining the position for starting the jump is therefore difficult. Also, in the case of the screen 520 shown in FIG. 6, the camera viewpoint is positioned on the opposite side of the direction of advance of snowboarder 501, so the shape of kicker 524 is difficult to grasp, making the operation of determining the position for starting the jump even more difficult.

Figure 7:
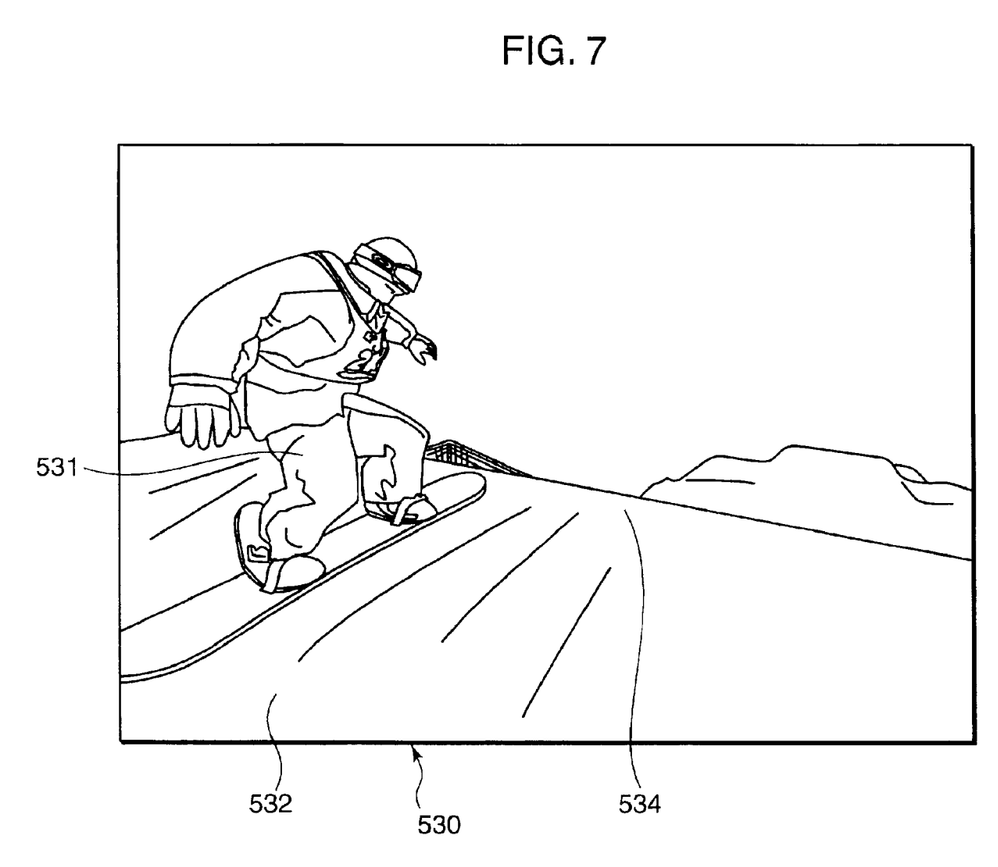
FIG. 7 is a screen view after movement of the camera viewpoint when the main character is approaching the kicker.

FIG. 7 is a screen view after movement of the camera viewpoint when the main character has approached the kicker. In screen 530, ski-slope 532 is displayed in approximately the lower half of the screen; snowboarder 531 who is the main character and is sliding in the rightwards and upwards direction of the screen over ski-slope 532 is displayed on the left-hand side; and kicker 534 is displayed in the direction of advance of snowboarder 531 in approximately the middle in the upper part. Just as in the case of FIG. 6, the game player performs control operation of the snowboarder 521 using controller 29 so as to make the distance jumped by snowboarder 521 long.

In this case, the camera viewpoint is positioned 45° from the opposite side of the direction of advance of snowboarder 511, so, in screen 530, the positions of the end face of kicker 534 (optimum position for starting the jump) and snowboarder 511 are displayed in a manner which is easy to view, so the operation of determining the position for starting the jump becomes easy in comparison with the case of FIG. 6.

It should be noted that, although not included in the flow chart shown in FIG. 3, an image of the main character seen from the camera viewpoint determined by the viewpoint movement section 302 is displayed on monitor 22 at a prescribed time interval (for example every frame) by image display section 303.

Figure 8:
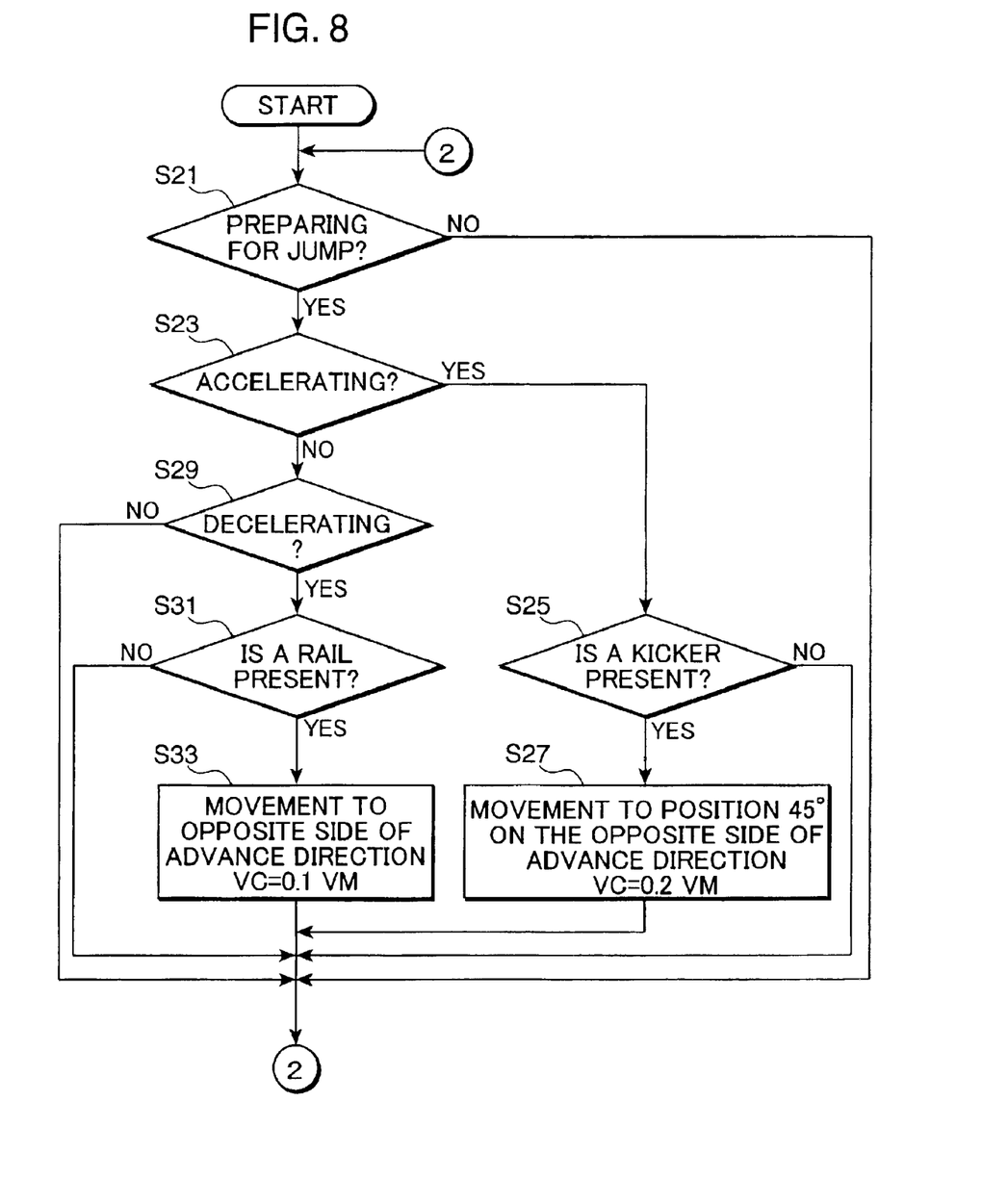
FIG. 8 is an example of a flow chart representing the action of a three-dimensional image processing device according to the present invention.

FIG. 8 is a flow chart different from FIG. 3 representing the action of a three-dimensional image processing device according to the present invention. First of all, viewpoint determining section 301 determines (step S21) whether or not the game player is preparing (estimating timing) to make the main character perform a jump. Specifically, a determination is made as to whether or not the jump control operation (depression of third button 29e) is being continued for more than a prescribed time (for example 20 frames, where one frame=1/60 sec). If the result of this determination is negative, the processing of this determination is repeated until the result of this determination is positive. On the other hand, if the result of this determination is positive, viewpoint determination section 301 performs (step S23) a determination as to whether or not the main character is being accelerated. Specifically, a determination is made as to whether or not the acceleration operation (depression of the up key 29U) has been continued for a prescribed time (for example 20 frames, where one frame=1/60 sec) or more.

If the result of this determination is negative, processing advances to step S29. On the other hand, if the result of this determination is positive, viewpoint determination section 301 determines (step S25) whether or not a kicker is present within a prescribed region taking the position of the main character in virtual three-dimensional space as reference (for example, the region within a distance of 20 m from the main character in virtual three-dimensional space). If the result of this determination is negative, processing returns to step S21. On the other hand, if the result of this determination is positive, viewpoint determination section 301 determines the position of the camera viewpoint as a position 45° from the opposite side to the direction of advance of the main character and viewpoint movement section 302 moves the position of the camera viewpoint to a position 45° from the opposite side of the direction of advance of the main character (step S27); processing then returns to step S21. The speed VC of movement of the camera viewpoint is then made 0.2 times the speed VM with which the main character is moving (VC=0.2×VM). FIG. 6 mentioned above is an example of a screen view prior to movement of position of the camera viewpoint in step S27. FIG. 7 mentioned above is an example of a screen view after movement of position of the camera viewpoint in step S27.

If the result of the determination in step 23 is negative, viewpoint determination section 301 determines (step S29) whether or not the main character is being decelerated. Specifically, a determination is made as to whether or not the acceleration operation (depression of down key 29D) has continued for a prescribed time (for example 20 frames where one frame=1/60 sec) or more. If the result of this determination is negative, processing returns to step S21. On the other hand, if the result of this determination is positive, viewpoint determination section 301 determines (step S31) whether or not there is a rail in a prescribed region with reference to the position of the main character in virtual three-dimensional space (for example the region of distance within 20 m from the main character in virtual three-dimensional space). If the result of this determination is negative, processing returns to step S21.

On the other hand, if the result this determination is positive, viewpoint determination section 301 determines the position of the camera viewpoint as a position on the opposite side of the direction of advance of the main character and viewpoint movement section 302 moves the position of the camera viewpoint to a position on the opposite side of the direction of advance of the main character (step S33); processing then returns to step S21. The speed of movement VC of the camera viewpoint is made to be 0.1 times the speed VM of movement of the main character (VC=0.1×VM). FIG. 4 described above is an example of a screen view prior to movement of the position of the camera viewpoint in step S33; FIG. 5 described above is an example of a screen view after movement of the position of the camera viewpoint in step S33.

Also, although not included in the flow chart shown in FIG. 8, image display section 303 displays on monitor 22 an image of the main character seen from the camera viewpoint whose position is determined by viewpoint movement section 302 at prescribed time intervals (for example every frame).

Also, the present invention may assume the following modes.

(A) Although, in this embodiment, the case was described in which the camera viewpoint position was found in accordance with the history of the control operations performed on the main object by the game player and the types of objects present in a prescribed range from the main object, a mode could be adopted in which this is found in accordance with one or other of the history of the control operations performed on the main object by the game player and the types of objects present in a prescribed range from the main object or a mode could be adopted in which this is found in accordance with other factors (for example, the value of a parameter representing the capability of the main object for action).

(B) Although, in this embodiment, the case was described in which the position of the camera viewpoint was found in accordance with the control operation history immediately prior thereto, a mode could be adopted in which the position of the camera viewpoint is found in accordance with the control operation history over a long time (for example from the start to the end of the preceding game). If this is done, the position of the camera viewpoint can be found in accordance with the game player's control operations, since idiosyncrasies and/or techniques etc of the game player's control operations can be grasped by analyzing the history of these operations over a long period.

(C) Although, in this embodiment, the case was described in which the speed with which the camera viewpoint is moved was found in accordance with the speed with which the main object moves in virtual three-dimensional space and the types of object present in a prescribed range from the main object, a mode would be possible in which this is found in-accordance with either the speed with which the main object moves in virtual three-dimensional space or the types of object present in a prescribed range from the main object or a mode would be possible in which this is found in accordance with another factor (for example the value of a parameter expressing the capability of the main object for action).

In summary, the invention relates to a recording medium which stores a three-dimensional image processing program that displays an image of a main object which is an object that plays a central role in the progress of a game and that moves through virtual three-dimensional space in which objects of a plurality of types are arranged, seen from a virtual camera viewpoint. The three-dimensional image processing program is configured to make a game device function as: viewpoint determination means that finds a position of said camera viewpoint appropriate to a control operation of determining an action of the main object, which control operation is assumed to be performed by the game player; viewpoint movement means that moves said camera viewpoint from its current position to the position found by said viewpoint determination means; and image display means that displays an image of the main object seen from said camera viewpoint.

With the aforementioned features, the three-dimensional image processing program makes the game device function as viewpoint determination means that finds a position of said camera viewpoint appropriate to a control operation of determining an action of the main object, which control operation is assumed to be performed by the game player; viewpoint movement means that moves said camera viewpoint from its current position to the position found by said viewpoint determination means; and image display means that displays an image of the main object seen from said camera viewpoint.

Specifically, the viewpoint determination means finds a camera viewpoint position appropriate to the control operation of determining the action of the main object, which is assumed to be performed by the game player; the viewpoint movement means moves the camera viewpoint from its current position to the position found by the viewpoint determination means; and the image display means displays an image of the main object seen from the camera viewpoint.

In this way, since an image of the main object seen from a camera viewpoint appropriate to the control operation assumed to be performed by the game player is displayed, the game player can concentrate on the operation of determining the action of the main object without needing to perform operation to move the camera viewpoint to a desired position. As a result, the speed of movement of the main object through virtual three-dimensional space can be increased, resulting in an exciting game and increasing the interest of the game.

Also, since the camera viewpoint is automatically moved to a position where an image appropriate to the control operation of the game player can be displayed, an image that is well adapted to control operations by the game player can be displayed in a natural and smooth fashion without the game player being conscious of movement of the camera viewpoint.

In this way, since an image of the main object seen from a camera viewpoint that is appropriate to the control operation assumed to be performed by the game player is displayed, there is no need for the game player to perform control operation to move the camera viewpoint to a desired position and the game player can therefore concentrate on control operations to determine the actions of the main object. As a result, the speed with which the main object moves through virtual three-dimensional space can be increased, making the game more exciting and improving the interest of the game.

Also, since the camera viewpoint is automatically moved to a position capable of displaying an image appropriate to the control operation performed by the game player, a screen which is well adapted to control operations by the game player can be displayed in a smooth and natural fashion without the game player being conscious of movement of the camera viewpoint.

In addition, said viewpoint determination means can be set to find the position of said camera viewpoint in accordance with the history of control operations in respect of the main object performed by the game player.

With the above features, the viewpoint determination means finds the position of said camera viewpoint in accordance with the history of control operations in respect of the main object performed by the game player.

Specifically, the position of said camera viewpoint is found by the viewpoint determination means in accordance with the history of control operations in respect of the main object performed by the game player.

In this way, since the position of the camera viewpoint is found in accordance with the history of control operations in respect of the main object performed by the game player, when for example the main object is made to perform a prescribed action, a position of the camera viewpoint is found that is appropriate to the idiosyncrasies (or technical level) of control operation by the game player when for example performing the prescribed operation previously.

In this way, since the position of the camera viewpoint is found in accordance with the history of control operations on the main object performed by the game player, in for example the case where the main object is made to perform a prescribed action, a camera viewpoint position can be found beforehand that is appropriate to the idiosyncrasies (or technical level) of prescribed control operations by the game player.

Furthermore, said viewpoint determination means can be set to find the position of said camera viewpoint in accordance with the type of object in a prescribed range from the main object.

With the above feature, the position of the camera viewpoint is found in accordance with the type of object in a prescribed range from the main object. That is, the position of the camera viewpoint is found by the viewpoint determination means in accordance with the type of object in a prescribed range from the main object. Consequently, in a game in which the type of action that is capable of being performed by the main object is set beforehand in accordance with the type of objects, a camera viewpoint position is found that is appropriate to the type of action capable of being executed by the main object.

Moreover, said viewpoint movement means is set to find the speed of movement of the camera viewpoint in accordance with the speed of movement of the main object through virtual three-dimensional space and moves said camera viewpoint with the speed that is thus found.

With this feature, the viewpoint movement means finds the speed of movement of the camera viewpoint in accordance with the speed of movement of the main object through virtual three-dimensional space and moves said camera viewpoint with the speed that is thus found. That is, the speed of movement of the camera viewpoint is found by the viewpoint movement means in accordance with the speed of movement of the main object through virtual three-dimensional space and the camera viewpoint is moved with the speed that is thus found. Consequently, since the speed of movement of the camera viewpoint can be increased in accordance with increased speed of movement of the main object through virtual three-dimensional space, rapid movement is effected to a camera viewpoint appropriate to the control operations assumed to be performed by the game player. As a result, in addition to improvement of operability, natural movement of the camera viewpoint is achieved.

Yet moreover, said viewpoint movement means finds the speed of movement of the camera viewpoint in accordance with the type of object in a prescribed range from the main object and moves said camera viewpoint with the speed that is thus found.

With the above feature, the viewpoint movement means finds the speed of movement of the camera viewpoint in accordance with the type of object in a prescribed range from the main object and moves said camera viewpoint with the speed that is thus found. That is, the speed of movement of the camera viewpoint is found by the viewpoint movement means in accordance with the type of object in a prescribed range from the main object and the camera viewpoint is moved with the speed that is thus found. Consequently, in a game in which the type of action that is capable of being executed by the main object is set beforehand in accordance with the type of objects, and the speed of operating the main object by the game player is different depending on the type of action, the speed of movement of the camera viewpoint can be increased when an object that requires rapid control operation of the main object on the part of the game player is in the vicinity. As a result, operability is improved.

The present invention also relates to a three-dimensional image processing method that displays an image of a main object which is an object that plays a central role in the progress of a game and that moves through virtual three-dimensional space in which objects of a plurality of types are arranged, seen from a virtual camera viewpoint in which a game device executes: viewpoint determination processing that finds a position of said camera viewpoint appropriate to a control operation of determining an action of the main object, which control operation is assumed to be performed by the game player; viewpoint movement processing that moves said camera viewpoint from its current position to the position found by said viewpoint determination processing; and image display processing that displays an image of the main object seen from said camera viewpoint.

With the present invention in the above form, the game device executes: viewpoint determination processing that finds a position of the camera viewpoint appropriate to a control operation of determining an action of the main object, which control operation is assumed to be performed by the game player; viewpoint movement processing that moves the camera viewpoint from its current position to the position found by the viewpoint determination processing; and image display processing that displays an image of the main object seen from the camera viewpoint.

That is, the viewpoint determination processing finds a position of the camera viewpoint appropriate to a control operation of determining an action of the main object, which control operation is soon to be performed by the game player; the viewpoint movement processing moves the camera viewpoint from its current position to the position found by the viewpoint determination processing; and the image display processing displays an image of the main object seen from the camera viewpoint.

In this way, since an image of the main object seen from a camera viewpoint that is appropriate to the control action assumed to be performed by the game player is displayed, the game player can concentrate on control operations to determine actions of the main object without needing to perform control operations to move the camera viewpoint to a desired position. As a result, speed of movement of the main object through virtual three-dimensional space can be increased, resulting in an exciting game and improving the interest of the game.

Also, since the camera viewpoint is automatically moved to a position capable of displaying an image appropriate to the control operations of the game player, a screen that is well adapted to control operations by the game player can be displayed in a smooth and natural fashion without the game player being conscious of movement of the camera viewpoint.

Thus, since an image of the main object seen from a camera viewpoint that is appropriate to the control operation assumed to be performed by the game player is displayed, the game player can concentrate on control operations to determine the actions of the main object without having to perform control operations to move the camera viewpoint to a desired position. As a result, the speed of movement of the main object through virtual three-dimensional space can be increased, resulting in an exciting game and improving the interest of the game.

Also, since the camera viewpoint is automatically moved to a position where an image appropriate to the control operations of the game player can be displayed, a screen that is well-adapted to control operations by the game player can be displayed in a smooth and natural fashion without the game player being conscious of movement of the camera viewpoint.

The present invention also relates to a three-dimensional image processing device that displays an image of a main object which is an object that plays a central role in the progress of a game and that moves through virtual three-dimensional space in which objects of a plurality of types are arranged, seen from a virtual camera viewpoint. The device comprising: viewpoint determination means that finds a position of said camera viewpoint appropriate to a control operation of determining an action of the main object, which control operation is assumed to be performed by the game player;

viewpoint movement means that moves said camera viewpoint from its current position to the position found by said viewpoint determination means; and image display means that displays an image of the main object seen from said camera viewpoint.

With the present invention in the above described form, the viewpoint determination means finds a position of the camera viewpoint appropriate to a control operation of determining an action of the main object, which control operation is assumed to be performed by the game player; the viewpoint movement means moves the camera viewpoint from its current position to the position found by the viewpoint determination means; and the image display means displays an image of the main object seen from the camera viewpoint.

In this way, since an image of the main object seen from a camera viewpoint that is appropriate to the control action assumed to be performed by the game player is displayed, the game player can concentrate on control operations to determine actions of the main object without needing to perform control operations to move the camera viewpoint to a desired position. As a result, speed of movement of the main object through virtual three-dimensional space can be increased, resulting in an exciting game and improving the interest of the game.

Also, since the camera viewpoint is automatically moved to a position capable of displaying an image appropriate to the control operations of the game player, a screen that is well adapted to control operations by the game player can be displayed in a smooth and natural fashion without the game player being conscious of movement of the camera viewpoint.

This application is based on Japanese Patent Application serial No. 2001-212703 filed in Japan Patent Office on Jul. 12, 2001, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A recording medium which stores an executable three-dimensional image processing program that displays an image of a main object which is an object that plays a central role in the progress of a game and that moves through virtual three-dimensional space in which objects of a plurality of subject matters are arranged, as seen from a virtual camera viewpoint, and said program makes a game device function as:

viewpoint determination means for setting a position of said camera viewpoint appropriate to a control operation of determining an action of the main object, said control operation being performed by the game player;

viewpoint movement means for moving said camera viewpoint from a current position to the position set by said viewpoint determination means, said viewpoint movement means setting a speed of movement of the camera viewpoint in accordance with a subject of at least one of the objects which is located in a prescribed range from the main object and moving said camera viewpoint with the speed that is set while said main object is in approach to the at least one object; and image display means for displaying an image of the main object as seen from said camera viewpoint.

2. The recording medium according to claim 1, wherein said viewpoint determination means sets the position of said camera viewpoint in accordance with a history of control operations controlling the main object and performed by the game player.

3. The recording medium according to claim 2, wherein said viewpoint determination means sets the position of said camera viewpoint based on the type of object in a prescribed range from the main object.

4. The recording medium according to claim 3, wherein said viewpoint movement means sets the speed of movement of the camera viewpoint in accordance with a proportion of the speed of movement of the main object through virtual three-dimensional space and moves said camera viewpoint with the speed that is thus set.

5. The recording medium according to claim 2, wherein said viewpoint movement means sets the speed of movement of the camera viewpoint in accordance with a proportion of the speed of movement of the main object through virtual three-dimensional space and moves said camera viewpoint with the speed that is thus set.

6. The recording medium according to claim 1, wherein said viewpoint determination means sets the position of said camera viewpoint based on the type of object in a prescribed range from the main object.

7. The recording medium according to claim 1, wherein said viewpoint movement means sets the speed of movement of the camera viewpoint in accordance with a proportion of the speed of movement of the main object through virtual three-dimensional space and moves said camera viewpoint with the speed that is thus set.

8. A recording medium according to claim 1, wherein said speed of movement of the camera is set in proportion to a speed of the movement of the main object.

9. A recording medium according to claim 8, wherein said speed of the movement of the camera is set at a coefficient, less than 1, times the speed of the movement of the main object.

10. A recording medium according to claim 8, wherein said speed of movement of the camera is set faster, when the object is a kicker from which the main object jumps, than a speed of movement when the object is a rail along which the main object slides.

11. A recording medium according to claim 10, wherein said speed of movement of the camera is set at 0.2 times the speed of the movement of the main object when the object is the kicker from which the main object jumps.

12. A recording medium according to claim 10, wherein said speed of movement of the camera is set at 0.1 times the speed of the movement of the main object when the object is the rail along which the main object slides.

13. A recording medium according to claim 1, wherein said viewpoint determination means determines:

(i) whether or not a jump control operation is being continued for more than a prescribed time, and then if a determination result is positive, then said view point determination means determines (ii) whether or not an acceleration operation is being continued for a prescribed time, and then if a determination result (ii) is positive, then said view point determination means determines (iii) whether or not a certain object is present within a prescribed region taking the main object's position as a reference, and if a determination result (iii) is positive, then said viewpoint movement means moves the position of the viewpoint to a certain degree from an advance direction of the main object and moves the viewpoint at a speed in proportion to a speed of the main object.

14. A three-dimensional image processing device that displays an image of a main object which is an object that plays a central role in progress of a game and that moves through virtual three-dimensional space in which objects of a plurality of subject matters are arranged, as seen from a virtual camera viewpoint, comprising:

viewpoint determination means for setting a position of said camera viewpoint appropriate to a control operation of determining an action of the main object, said control operation being performed by a game player;

viewpoint movement means for moving said camera viewpoint from a current position to the position set by said viewpoint determination means, said viewpoint movement means setting a speed of movement of the camera viewpoint in accordance with a subject matter of at least one of the objects which is located in a prescribed range from the main object and moving said camera viewpoint with the speed that is set while said main object is in approach to the at least one object; and image display means for displaying an image of the main object as seen from said camera viewpoint.

15. A three-dimensional image processing method that displays an image of a main object which is an object that plays a central role in progress of a game and that moves through virtual three-dimensional space in which objects of a plurality of subject matters are arranged, as seen from a virtual camera viewpoint, said method comprising the steps of:

viewpoint determination step for setting a position of said camera viewpoint appropriate to a control operation of determining an action of the main object, said control operation being performed by a game player;

viewpoint movement step for moving said camera viewpoint from a current position to the position set by said viewpoint determination processing, said viewpoint movement step setting a speed of movement of the camera viewpoint in accordance with a subject matter of at least one of the objects which is located in a prescribed range from the main object and moving said camera viewpoint with the speed that is set while said main object is in approach to the least one object; and image display step for displaying an image of the main object as seen from said camera viewpoint.

* * * * *